(12) United States Patent
Gruett

(10) Patent No.: US 6,726,817 B1
(45) Date of Patent: Apr. 27, 2004

(54) CHLORINATOR CONTROLLER

(75) Inventor: Glenn Gruett, New London, WI (US)

(73) Assignee: Water-Right, Inc., Appleton, WI (US)

( * ) Notice: Subject to any disclaimer, the term of this patent is extended or adjusted under 35 U.S.C. 154(b) by 0 days.

(21) Appl. No.: 09/312,473

(22) Filed: May 17, 1999

Related U.S. Application Data

(60) Provisional application No. 60/086,148, filed on May 20, 1998.

(51) Int. Cl.$^7$ ............................ G01N 27/26; C25B 1/26; C25B 15/02
(52) U.S. Cl. ............... 204/400; 204/228.6; 204/229.8
(58) Field of Search ............... 205/778.5; 204/400, 204/229.2, 229.4, 229.7, 229.8, 230.8, 230.2, 228.3

(56) References Cited

U.S. PATENT DOCUMENTS

| | | | | |
|---|---|---|---|---|
| 3,627,133 A | * | 12/1971 | Rak | 210/140 |
| 4,299,698 A | * | 11/1981 | Rak et al. | 210/96.1 |
| 4,439,295 A | * | 3/1984 | Richards | 204/229 |
| 5,221,444 A | * | 6/1993 | Silveri | 204/149 |
| 5,221,451 A | * | 6/1993 | Seneff et al. | 204/229 |
| 5,711,865 A | * | 1/1998 | Caesar | 205/628 |
| 5,751,598 A | * | 5/1998 | Zabinski et al. | 700/266 |

* cited by examiner

Primary Examiner—Kaj K. Olsen
(74) Attorney, Agent, or Firm—Ryan Kromholz & Manion, S.C.

(57) ABSTRACT

An apparatus for determining ions strength in a solution. In relation to a chlorinator, a control circuit senses the strength of the brine by determining current flow through an associated chlorinator. Depending on the level of current flow, different signal configurations occur to advise of the status of the apparatus.

6 Claims, 5 Drawing Sheets

CHLORINATOR CONTROLLER

RELATED APPLICATION

This application is the non-provisional filing of provisional application No. 60/086,148, filed May 20, 1998.

BACKGROUND OF THE INVENTION

This invention relates to control of a chlorinator used in combination with a water treatment system, and in particular to a control method for monitoring the operation of the chlorinator during functioning of a water softener.

Softening of hard water using ion exchange by means of a water softener is well known. In such an apparatus, the calcium in the hard water is removed by ion exchange and replaced by sodium. Such devices are conventional, and form no part of the present invention.

Often, it is also desired to sanitize the water softener at the same time that it passes through its regeneration cycle. A chlorine generator is used for that purpose, and U.S. Pat. No. 3,627,133, the disclosure of which is incorporated herein by reference, discloses such a system. In the '133 patent, a chlorine generator is provided in the inlet-outlet conduit to the brine tank, so that sanitizing chlorine can be generated and provided to the brine flow for sanitizing the softened water generated by the water softener.

SUMMARY OF THE INVENTION

The present invention is directed to a system for monitoring the operation of the chlorinator as it functions with the water treatment system. The invention utilizes a control circuit which senses the strength of the brine, rather than the conductivity of the brine, by sensing the current flow through the chlorinator. Depending on the level of the current flow, different signal configurations are provided.

In accordance with the preferred form of the invention, three status lights are provided and four modes of operation are signaled. A red status light is provided to signify the regeneration cycle of the water softener. A green signal light is provided to signify normal service operation of the water softener. A yellow signal light is provided to indicate an abnormal status of operation of the chlorinator.

In its four modes, a first mode is provided to indicate initial application of power to the softener and chlorinator. In this mode, the red light is off, the yellow light is off, and the green light is on. A second mode is provided to indicate a normal regeneration cycle. When regeneration commences, the red light turns on, the yellow light is off, and the green light is off. At the conclusion of the cycle, the red light is off, the yellow light is off, and the green light is on, thus indicating a normal service operation.

In the third mode of operation, signaling is provided to indicate that regeneration has begun, but no brine is available for ion exchange. In this mode, as in the normal regeneration mode, initially the red light is on, the yellow light is on and the green light is off. At the conclusion of this mode, however, the red light is off, the yellow light is on and the green light is on.

In the fourth and final mode of operation, indicated as the operation of the softener through the regeneration stage, there is insufficient brine to complete the entire brining operation. As in normal regeneration, initially the red light is on, the yellow light is off and the green light is off. At the conclusion of this mode of operation, however, the red light is off, the yellow light is off and the green light is on.

BRIEF DESCRIPTION OF THE DRAWINGS

The invention is described in greater detail in the following description of examples embodying the best mode of the invention, taken in conjunction with the drawing figures, in which.

DESCRIPTION OF AN EXAMPLE EMBODYING THE BEST OF THE INVENTION

Figure 1:
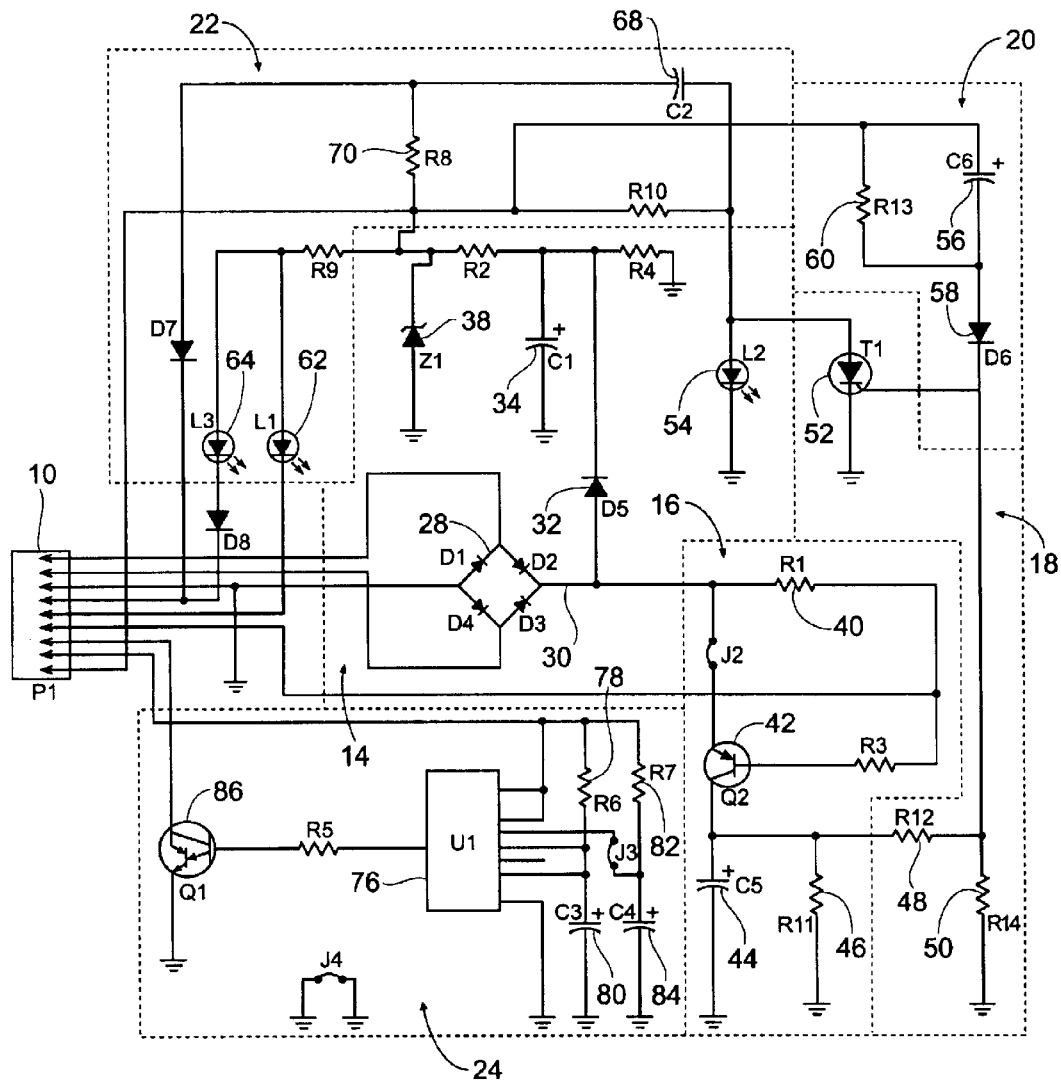
FIG. 1 is a circuit diagram of one form of circuit utilized for the invention.

FIG. 1 illustrates a first version of a control circuit according to the invention, when connected to a nine pin connector 10. The pin connections of the connector 10 are numbered, and correspond to pin connections in a chlorinator status suite 12 depicted in FIG. 2.

The circuit illustrated in FIG. 1 has six basic sections, a power section 14, a current sensing section 16, a chlorinator function verification section 18, a power reset section 20, a function indicator and lamp enable section 22, and a chlorinator enable and timing section 24. The functions of each of the sections in relation to their elements and in relation to the elements illustrated in FIG. 2, will now be described.

Figure 2:
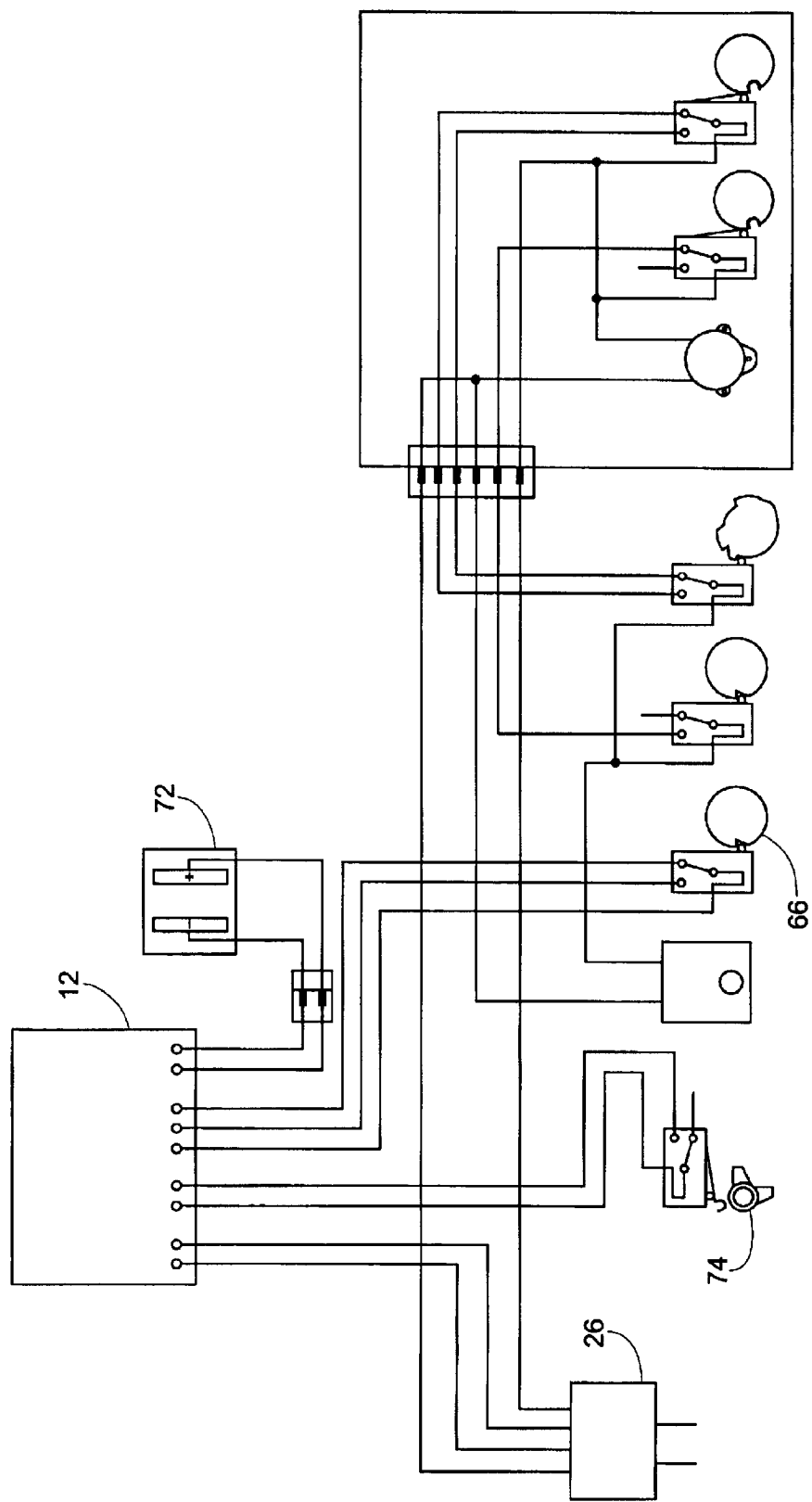
FIG. 2 is a schematic illustration of the operation of the chlorinator and the water softener in relation to the circuit connections of FIG. 1.

The power section 14 accepts line power from terminals one and two of the connector 10, provided by the transformer 26 (FIG. 2). A diode bridge 28 rectifies the alternating current, and direct current is output on line 30. This current is available to the connector 10 at pin 4, and also passes through the diode 32, where a capacitor 34, resistor 36 and zener diode 38 provide filtered and regulated power to the remaining circuitry of FIG. 1.

The current sensing section 16 includes a resistor 40 which provides a voltage drop that is sensed by the base of a transistor 42, turning the transistor 42 on. The output of the transistor 42 is filtered by a capacitor 44 and a voltage level appears across the resistor 46 depending on the current passing through the transistor 42 when it is on.

In the chlorinator function verification section 18, voltage across the resistor 46 is adjusted by resistors 48 and 50, and that voltage is applied to the gate of a silicon-controlled rectifier (SCR) 52. If the voltage level at the gate of the SCR 52 is sufficiently high, then the SCR 52 latches on, and a yellow LED 54, if on, is extinguished.

The power reset section 20 acts to keep the yellow LED 54 off. When power is applied, the fast rise of the voltage passes through the capacitor 56 and diode 58 to provide a sufficient voltage to the gate of the SCR 52 to turn it on, thus latching the yellow LED 54 off. The resistor 60 ensures that this function occurs only when initial power is applied to the circuit of FIG. 1.

The function indicator and lamp enable section 22 includes a green LED 62 and a red LED 64. The respective LED's 62 and 64 are operated by the service signal cam switch 66 (FIG. 2) through the pins 8 or 7, respectively, of the connector 10. The connection of either is to common through pin 3 of the connector 10.

Also, when regeneration of the softener occurs, the capacitor 68, which is normally connected to rectify voltage through a resistor 70, is also connected to common. This sends a large negative voltage pulse to the yellow LED 54 and to the SCR 52, eliminating the current flow to the SCR 52 to cause it to unlatch in an off state. With the SCR 52 not conducting, the yellow LED 54 is activated, signaling that the circuit of FIG. 1 is prepared to sense current flow through the chlorinator 72 (FIG. 2).

In the chlorinator enable and timing section 24, when the regeneration brine cam 74 (FIG. 2) of the softener closes, rectified voltage from pin 6 of the connector 10 is routed to pin 9, which then starts a timing circuit comprised of a timer 76 controlled by a resistor 78, capacitor 80, resistor 82 and capacitor 84. While the timer 76 is activated, its output is applied to the base of a transistor 86 which is then turned on, connecting pin 5 of the connector 10 to common. Since the chlorinator 72 (FIG. 2) is connected between pin 5 and the common terminal of pin 4, the chlorinator 72 receives power. If brine is present within the chlorinator 72, current will be generated to produce chlorine.

For the four modes of operation, the first mode is when power is first applied to the circuit of FIG. 1. Assuming that the brine cam 74 is not activated, in this mode, the red LED 64 is off, the yellow LED 54 is off, and the green LED 62 is turned on.

In the normal regeneration cycle, when the brine cam 74 is activated, the red LED 64 is turned on, the yellow LED 54 is turned on, and the green LED 62 is turned off. A normal regeneration cycle comprising of back wash, brine and rinse, rapid rinse and filling of the brine tank then follow. In back wash, the lights remain in the same state. In the brine and rinse stage, the chlorinator enable and timing section 24 is activated, and therefore the red LED 64 is on and the yellow LED 54 is latched off. These states remain through the rapid rinse and the filling of the brine tank. Then, when the regeneration cycle is completed, the chlorinator enabling and timing section 24 turns the timer 76 off, turning off the transistor 86 and therefore causing the red LED 64 to turn off and the green LED 62 to turn on, while the yellow LED 54 remains latched off.

In the third mode of operation, where regeneration is commenced but there is no brine available, as in the second mode of operation, when this mode is entered, the red LED 64 is turned on, the green LED 62 is turned off and the yellow LED 54 is turned on. Then, during the regeneration cycle, because there is no brine, during back wash, brine and rinse, rapid rinse and filling of the brine tank, the red LED 64 remains on, and the yellow LED 54 is never turned off At the end of the cycle, when the timer 76 is turned off, the red LED 64 is turned off and the green LED 62 is turned on, but the yellow LED 54 remains on, indicating that regeneration did not occur.

Finally, in the fourth mode of operation where there is insufficient brine to complete the brining stage, as in the second and third modes, initially the red LED 64 is turned on, the green LED 62 is turned off and the yellow LED 54 is turned on. In the brine and rinse portion of the regeneration cycle, however, if there is sufficient brine for current to flow, such as at least a 20% concentration, the current flow causes the yellow LED 54 to latch off It remains off for the rest of the regeneration cycle, and when the regeneration cycle is completed and the timer 76 turns the transistor 86 off, the yellow LED 54 remains off, and the red LED 64 is turned off and the green LED 62 is turned on.

Figure 3:
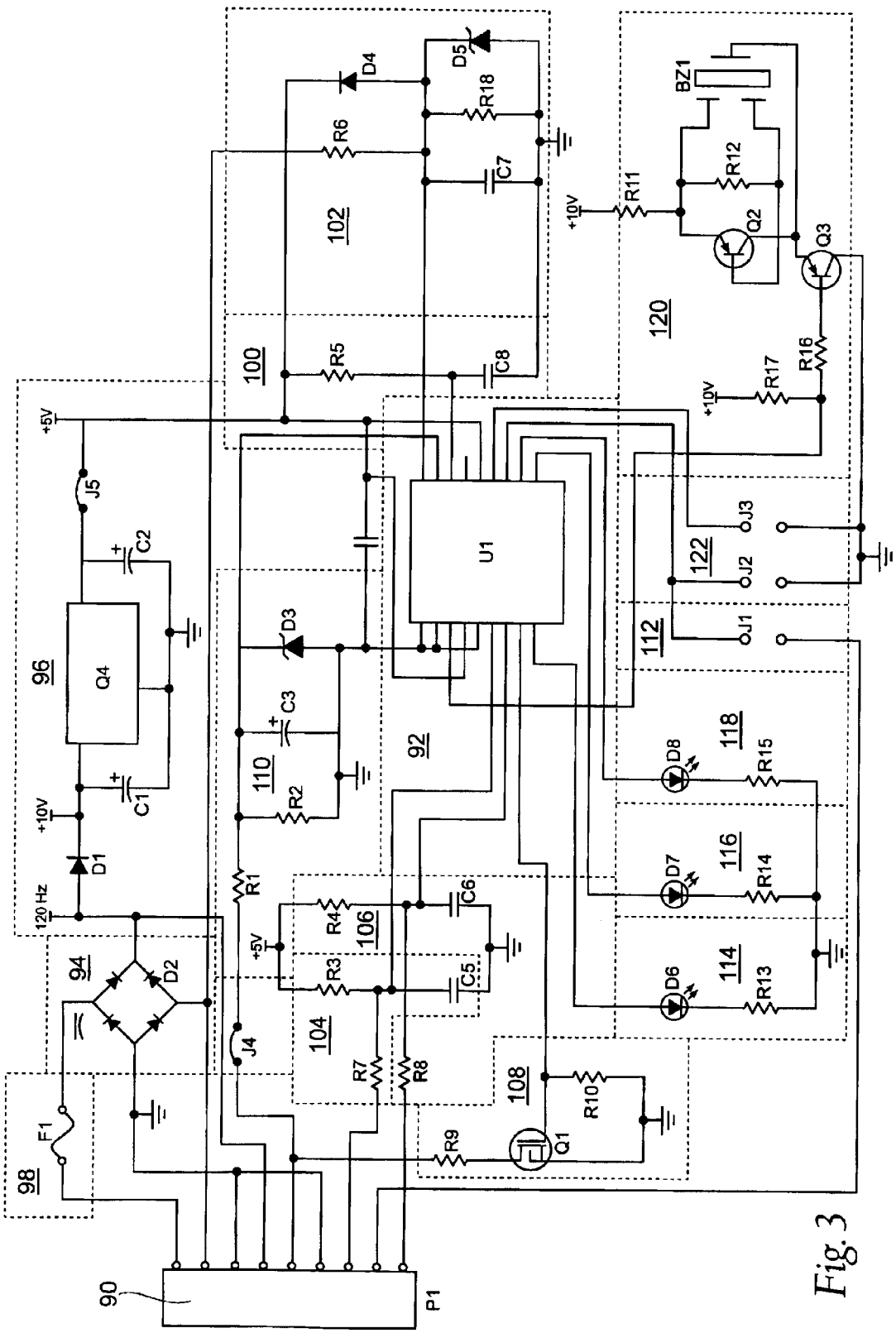
FIG. 3 is a circuit diagram of another form of circuit utilized for the invention.
Figure 4:
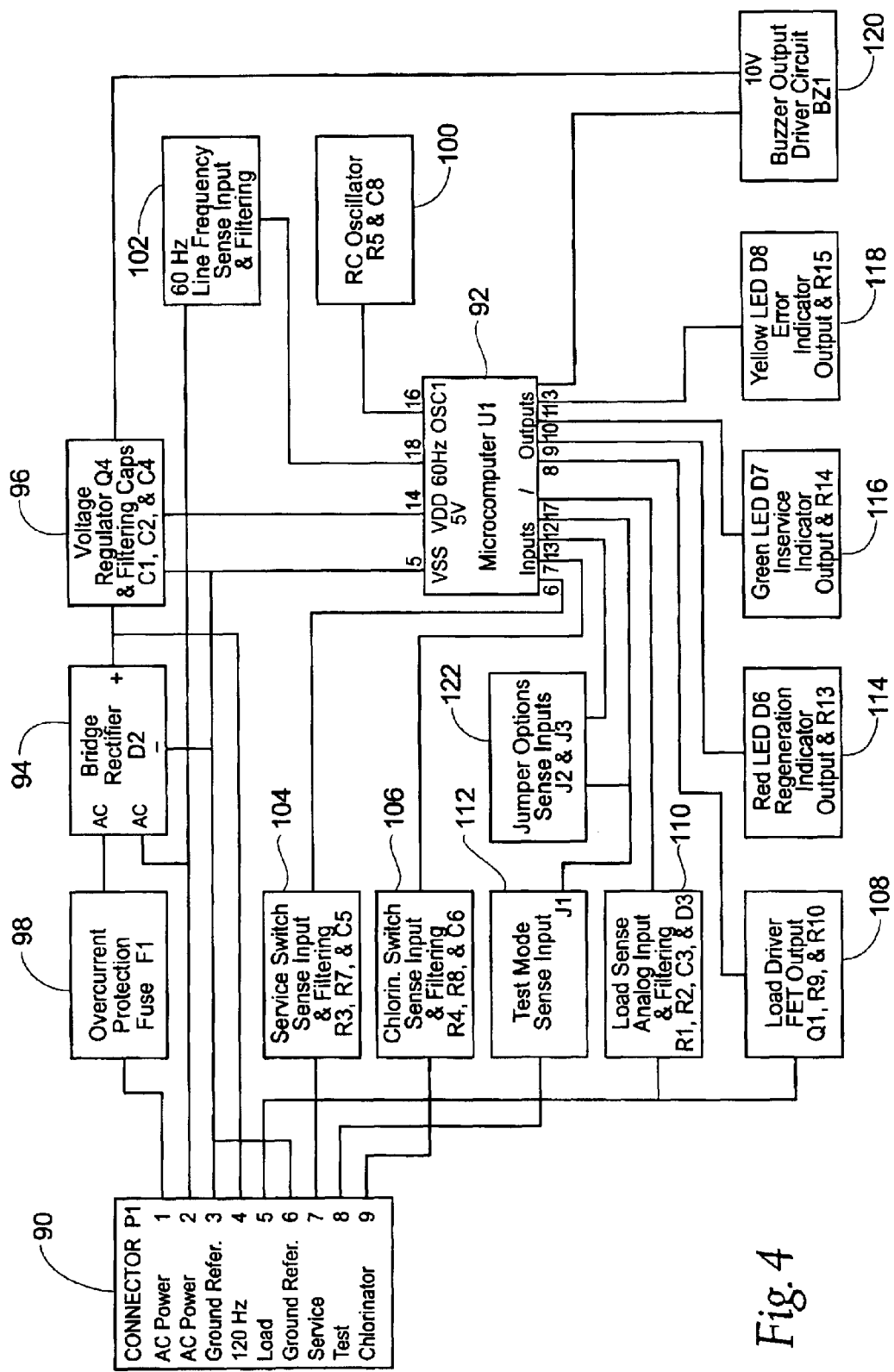
FIG. 4 is a functional block diagram corresponding to the circuit of FIG. 3.
Figure 5:
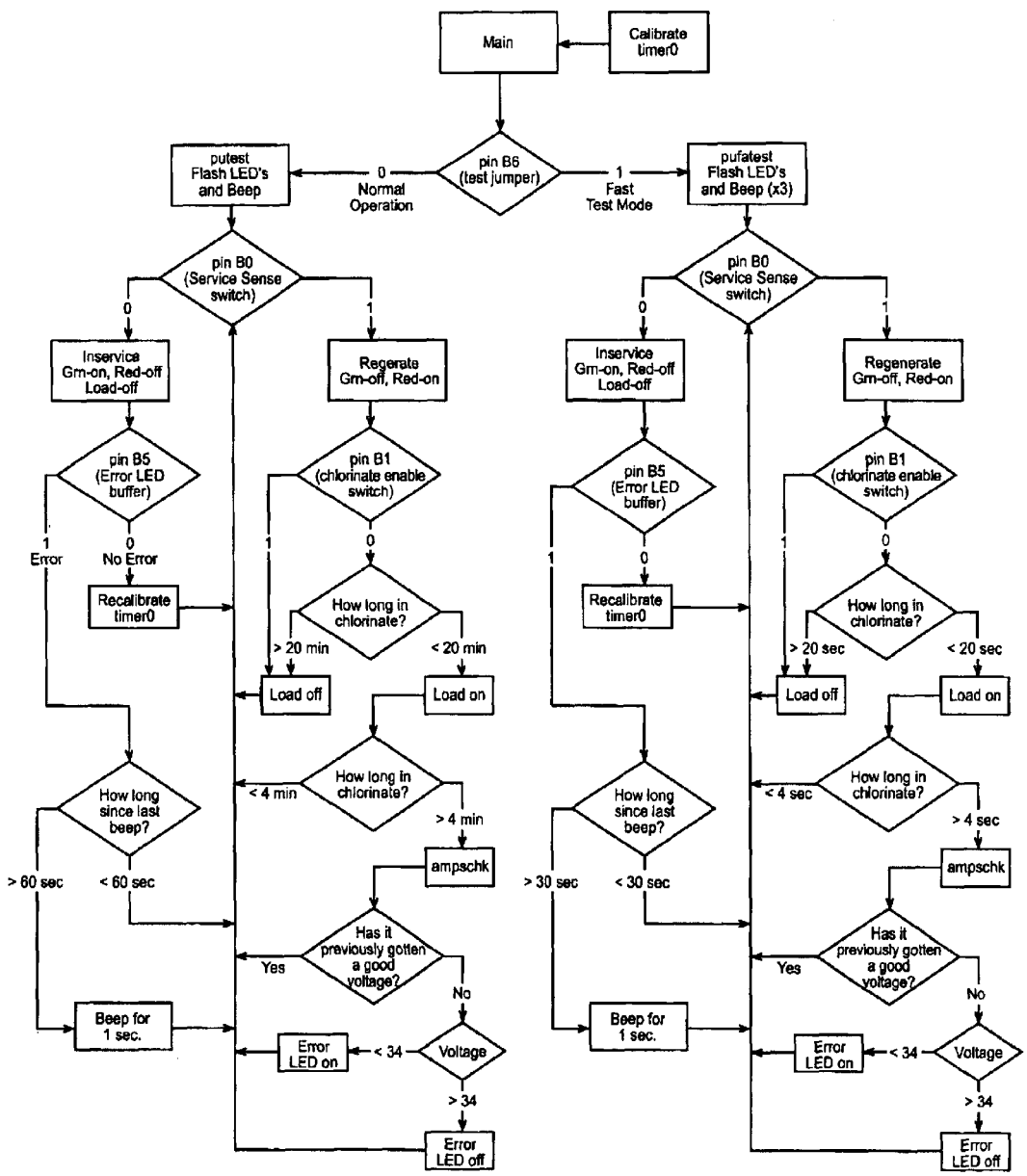
FIG. 5 is a flow chart of operation of the second form of the invention employing the circuit of FIG. 3.

FIGS. 3 through 5 depict a second form of the invention when connected to a nine pin connector 90, identical to the nine pin connector 10. The pin connections of the connector 90 are numbered, and correspond to pin connections in the chlorinator status suite 12 of FIG. 2.

The circuit illustrated in FIGS. 3 and 4 can be broken into a series of functional blocks. Taking the blocks in no particular order, first is a microcomputer 92, which is the functional heart of the circuit illustrated. Power is supplied to the microcomputer 92 from pins 1 and 2 of the connector 90. A bridge rectifier 94 rectifies alternating current to direct current. A voltage regulator 96 regulates the voltage from the rectifier 94. The regulator 96 also employs a series of filtering capacitors. The rectifier 94 is protected by an over current protection fuse 98.

The microcomputer 92 requires direct current voltage and an oscillator in order to operate. The direct current voltage is supplied by the voltage regulator 96, and an oscillator 100, comprising a resistor R5 and a capacitor C8, provides the necessary osculation.

Time keeping for the microcomputer 92 is based upon that of the alternating current supply, which is assumed to be the typical 60 herz signal, from which the microcomputer 92 can create a timing signal used for all time keeping, such as a one millisecond timing signal. A line frequency sense input and filtering circuit 102 current limits and filters the 60 herz signal.

Pin 7 of the connector 9 is connected to the service signal cam 66. During normal service, a service switch sense input and filer 104 controls the current to the microcomputer 92.

Pin 9 of the connector 90 is connected to the brine cam 74 for enabling of the chlorinator 72. A chlorinator switch sense input and filter 106 limits current to the microcomputer 92. Output from the chlorinator 72 is controlled by a load driver circuit 108. Current to the load driver circuit 108 from pin 9 of the pin connector 90 is limited by a load sense analog input and filtering circuit 110. When the service signal cam 66 is connected to the test pin 8 of the pin connector 90, a test input is supplied to the microcomputer 92 by a test mode sense input 112.

A red LED indicator 114, a green LED indicator 116 and a yellow LED indicator 118 are all connected to the microcomputer 92. In addition, a buzzer 120 is connected to the microcomputer 92 and is employed to give an audible signal, as explained further below. An additional test mode input 122 can be employed to test the buzzer 120, by application of a simple jumper J2.

The microcomputer 92 senses all inputs and outputs connected to it, and determines the operating state for driving the LED indicators 114, 116 and 118, as well as the buzzer 120. The microcomputer requires a five volt direct current power supply and an oscillator in order to operate, with the voltage regulator 96 providing the five volt power supply and the oscillator 100 providing the necessary oscillation. The oscillator 100 is a simple resistor/capacitor oscillator utilizing the resistor R5 and the capacitor C8 which produces a 900 Khz oscillation signal when connected to the microcomputer 92. Capacitors C1, C2 and C4 of the voltage regulator 96 filter the voltage signal received from the bridge rectifier 94, while the fuse 98 protects the circuit of FIG. 3 from excess current.

As mentioned above, the basis for time keeping is the 60 herz signal of the alternating current voltage that powers the invention. In the line frequency sense input and filtering circuit 102, the resistor R6 current limits that 60 herz signal, and forms a voltage divider with the resistor R18, which, in combination with the diodes D4 and D5, limit the input voltage to the microcomputer 92. The capacitor C7 of the circuit 102 serves to filter any noise of the input.

When the service signal cam 66 is switched to provide a signal to the pin 7 of the pin connector 90, that signal is provided to the service switch sense input and filter 104. The resistor R7 of the filter 104 limits the current, and the capacitor C5 and pull up resistor R3 filter input on the pin 7. Similarly, when the brine cam 74 is activated to enable the chlorinator 72, a signal at the pin 9 of the connector 90 is received by the chlorinator switch sense input and filter 106. The resistor R8 limits the current, and the input is filtered by the capacitor C6 and the pull up resistor R4.

Testing is controlled by application of jumpers to either the test mode sense input 112 or the test mode input 122. When the jumper J1 is installed, a general test mode of the circuit is employed. When the jumper J2 is employed, the buzzer 120 can be tested. The buzzer 120 utilizes ten volts direct current from the bridge rectifier 94, with the resistor R11 limiting the current. The transistor Q2 and the resistor R12 form a feedback for the buzzer BZ1, and the transistor Q3 along with the resistors R17 and R16 form a switch to allow the microcomputer 92 to turn on and off the buzzer BZ1.

Output from the chlorinator 72 appears at pin 5 of the connector 90, and is directed to the load driver circuit 108. That output is controlled by the field effect transistor Q1 and the resistors R9 and R10. Current through the resistor R9 is monitored using the analog input to the microcomputer 92. That is through the load sense analog input and filtering circuit 110, where input current is limited by the resistor R1, voltage is limited by the zener diode D3, and the input signal is filtered with the resistor R2 and capacitor C3 before being applied to the microcomputer 92.

In operation, when the service signal cam 66 (or any other service signal switch to which the circuit of FIGS. 3 and 4 is connected) provides a signal to the pin 7 of the connector 90, the chlorinator is in service, and the microcomputer 92 activates the green LED D7. During regeneration, however, there is no signal to the pin 7, and the microcomputer 92 activates the red LED D6. For test purposes, a signal is applied to the pin 8 of the connector 90. If the jumper J1 is applied, a fast test mode sequence (see FIG. 5) is initiated. Otherwise, normal operation occurs.

When a signal is received at the pin 9 of the connector 90, as explained above, the chlorinator 72 is activated. Both the analog input 110 and the output of the chlorinator 72 are tied to the pin 5 of the connector 90. Chlorination can only occur during the regeneration mode when the chlorinator switch is closed. The chlorination cycle is twenty minutes, and at the start of the chlorination cycle, the load driver circuit 108 pulls the voltage at the pin 5 low. The microcomputer 92 times for four minutes, and after the four minutes have elapsed, the analog input from the circuit 110 is evaluated to determine the current draw at the pin 5. If the current draw is greater than 0.5 amperes, the cycle continues without change. If the current draw in under 0.5 amperes, the microcomputer 92 then activates the yellow LED D8, and the microcomputer 92 then reads the analog input every 100 milliseconds until the current flow is greater than 0.5 amperes (at which time the yellow LED D8 is switched off), or the twenty minute chlorination cycle has concluded. If, at conclusion of the chlorination cycle, the current draw is above 0.5 amperes, the yellow LED D8 is off and no further measurements need be taken until the next chlorination cycle. However, if the current draw is below 0.5 amperes and the yellow LED D8 remains activated, when the microcomputer 92 returns the system to the normal in service mode, the buzzer 120 is activated to give a one second tone at the beginning of the mode and again for every 60 seconds during the duration of the mode. Therefore, not only is there a visual indication that insufficient regeneration has occurred, but also there is an audible indication, as well.

In the test mode, with the jumper J1 applied, all functions are greatly accelerated. Instead of the chlorination cycle being twenty minutes, it is reduced to twenty seconds. Similarly, instead of the start of analog input reading from the circuit 110 being four minutes, that is reduced to four seconds. Therefore, in the test mode, one can quickly test operation of the circuit, within twenty seconds.

While the invention is described in relation to sensing the current drawn through a chlorinator in a water softener system and displaying appropriate signals accordingly, it could also be used in connection with any time that a current is to be sensed flowing between two probes in a solution. Various other usages of the invention will be apparent to one of ordinary skill in the art.

Various changes can be made to the invention without departing from the spirit thereof or scope of the following claims.

What is claimed is:

1. An apparatus for detecting the strength of a brine solution in a water softener, said water softener being capable of regeneration, said apparatus comprising:

a source of brine solution, a chlorine gas generator proximate the brine solution, the chlorine gas generator having an anode and a cathode, and a flow of the brine solution therethrough, means for applying an electrical current flow to the anode and cathode, a controller connected to the applying means and the chlorine gas generator, a sensor capable of determining levels of flow of current between the anode and cathodes, means for operating the sensor only at predetermined time periods during regeneration of the water softener, wherein the strength of the brine solution is thereby periodically detected and transmitted to said controller, said controller configured to activate the means for applying only during regeneration of the water softener, and a plurality of signals activated dependent on said levels.

2. An apparatus according to claim 1 in which said controller comprises a microcomputer.

3. An apparatus according to claim 2 in which said sensor comprises an analog input connected to said microcomputer.

4. An apparatus according to claim 2 in which said signal comprises at least one light activated by said microcomputer.

5. An apparatus according to claim 2 in which said signal includes an audible alarm activated by said microcomputer.

6. An apparatus according to claim 1 including an audible alarm.

* * * * *